Feb. 22, 1949.     L. W. GANT     2,462,177
COTTON PICKER
Filed March 6, 1945
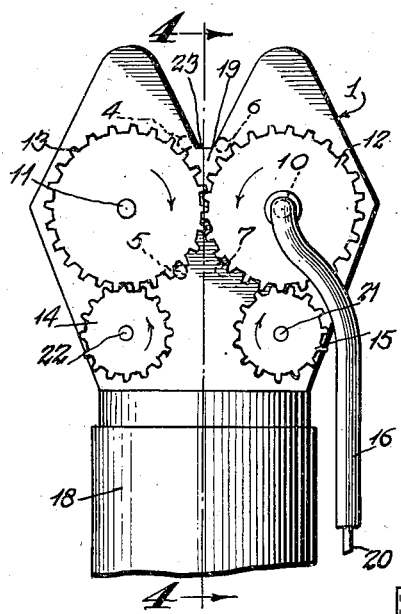
Fig.1.
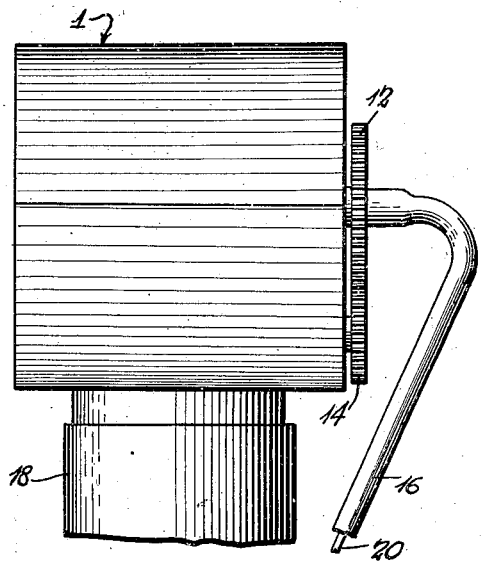
Fig.2.
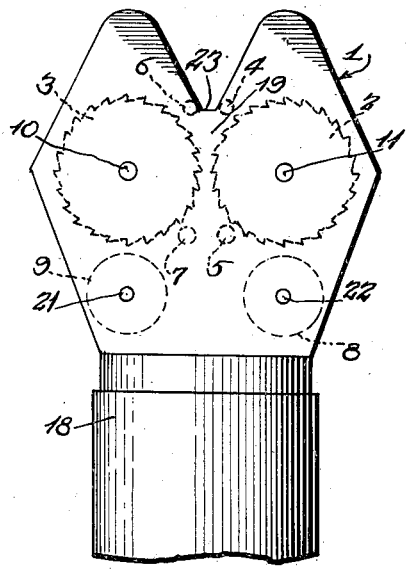
Fig.3.
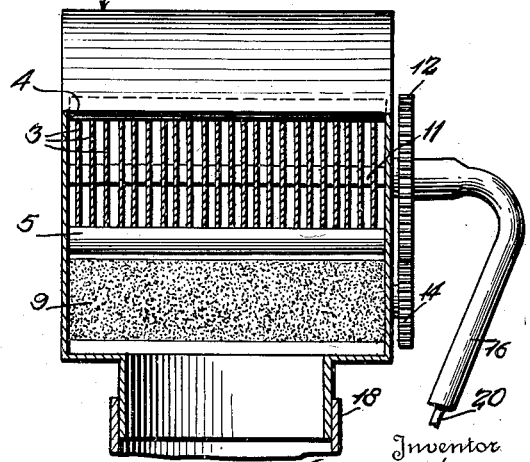
Fig.4.
Fig.5.
Inventor
Lee Weldon Gant.
By McMorrow
Attorneys Patented Feb. 22, 1949

2,462,177

UNITED STATES PATENT OFFICE 2,462,177

COTTON PICKER

Lee W. Gant, McKinney, Tex.

Application March 6, 1945, Serial No. 581,244

1 Claim. (Cl. 56—40)

This invention relates to mechanical cotton pickers and more particularly to an improved picker head for removing cotton from the stalk.

A main object of this invention is to provide a novel picker head of simple construction and operation for mechanically removing cotton from its stalk.

A further object of this invention is to provide an improved mechanical cotton picker having self-clearing features.

Further objects and advantages of the invention will appear from the following description and claim, and from the accompanying drawings, wherein:

Figure 1 is a top view of a cotton picker head in accordance with this invention, Figure 2 is a side elevational view of the picker head of Figure 1.

Figure 3 is a bottom view of the picker head of Figure 1.

Figure 4 is a cross-sectional view taken on line 4—4 of Figure 1.

Figure 5 is an end view looking into the forward portion of the cotton picker head of Figure 1.

Referring to the drawings, 1 designates a rigid housing of sheet metal or other suitable material in which are mounted two rows of spaced sharp-toothed circular discs comprising a first set of spaced discs 2 mounted on a shaft 11 and a second set of spaced discs 3 mounted on a shaft 10, shafts 10 and 11 being parallel and spaced to provide narrow clearance between the rows of discs.

Shafts 10 and 11 extend externally of housing 1 and respectively carry meshing gears 12 and 13. Shaft 10 is operatively connected to a prime mover by a flexible shaft 20 contained in a flexible sheath 16.

Mounted inwardly of housing 1 and parallel to shafts 10 and 11 are shafts 21 and 22. Shaft 21 carries a brush member 9 and shaft 22 carries a brush member 8. An external gear 15 is connected to shaft 21 and meshes with gear 12, and a similar external gear 14 is connected to a shaft 22 and meshes with gear 11.

The forward portion of housing 1 is formed with a trough-shaped recessed portion 23 which terminates in a slot 19 extending inwardly a substantial distance so that a cotton stalk inserted in slot 19 will be positioned close to the toothed discs. The teeth on the discs are opposed so that rotation of shaft 10 by flexible shaft 20 and the meshing of gears 12 and 13 causes the teeth to move inwardly toward each other and catch cotton on the stalk to disengage said cotton from said stalk.

A pair of guide rollers 4 and 6 are provided adjacent slot 19 freely journalled in the top and bottom walls of housing 1 and extending parallel to said slot to aid in properly guiding the cotton stalk into position opposite the toothed blades. A second pair of guide rollers 5 and 7 similarly journalled in the top and bottom walls of housing 11 rearwardly adjacent the respective toothed blades and parallel to rollers 4 and 6 aids the loosened cotton to free itself from the toothed blades by acting as stop means for the cotton carried on said blades when said blades begin to rotate away from each other. Gears 14 and 15, as shown in Figure 1, are smaller than gears 12 and 13 with which they are respectively in mesh. Brushes 8 and 9 therefore rotate faster than the respective toothed blades 2 and 3, and provide a brushing action with respect to cotton carried on the blades. The residual cotton removed from the blades by the brushes is swept toward the side walls of housing 1 and from thence rearwardly thereof.

The inner portion of housing 1 is connected to a flexible suction conduit 18 which draws the loose cotton into an appropriate receptacle. The suction for conduit 18 is provided by an appropriate suction means.

In operation the picker head housing is positioned so that the cotton stalk is caused to enter slot 19. Toothed blades 2 and 3 seize the cotton fibres and disengage them from the stalk, causing said fibres to be carried by the blades into abutment with rollers 5 and 7. Said rollers being relatively stationary, strip the cotton fibres off the moving peripheries of the blades, whereupon the removed fibres pass between said rollers as the stripped cotton piles up on the rollers. Brushes 8 and 9 remove remaining adherent cotton fibres from the toothed blades. The cotton fibres are caught up by the suction air current produced by the suction conduit 18 and are drawn into said conduit where they are finally deposited in an appropriate receptacle.

While a specific embodiment of a cotton picker head has been disclosed in the foregoing description, it will be understood that various modifications within the spirit of the invention may occur to those skilled in the art. Therefore it is intended that no limitations be placed on the invention other than as defined by the scope of the appended claim.

What is claimed is:

A cotton picker head comprising a casing formed at its forward wall with a guide trough adapted to receive a cotton stalk, the bottom of the trough being formed with a slot extending substantially for the full length of the trough, a pair of toothed rotors journalled symmetrically in the casing on each side of the slot, adjacent thereto and parallel therewith, means for rotating said rotors in opposite directions with the forward peripheral toothed portions thereof moving toward each other, a pair of rotary brushes journalled symmetrically in the casing, each brush being rearwardly adjacent and parallel to one of the toothed rotors, means for rotating each brush in an opposite sense and at a different rate of speed relative to the toothed rotor to which it is rearwardly adjacent, a pair of stop members secured symmetrically in the casing, each stop member being rearwardly adjacent and parallel to one of the toothed rotors but being positioned forwardly with respect to the brush on that side, whereby a substantial portion of the cotton carried on the periphery of said one of the toothed rotors will be engaged by the stop member, and removes from the rotor responsive to rotation of said rotor, and whereby residual cotton carried past the stop member by the rotor will be engaged by the brush rearwardly adjacent the rotor.

LEE W. GANT.

REFERENCES CITED

The following references are of record in the file of this patent:

UNITED STATES PATENTS

| Number | Name | Date |
|---|---|---|
| 1,264,575 | Stukenborg | Apr. 30, 1918 |
| 1,558,718 | Stukenborg | Oct. 27, 1925 |
| 1,927,723 | Taliaferro | Sept. 19, 1933 |
| 2,073,660 | Stukenborg | Mar. 16, 1937 |
| 2,208,570 | Box | July 23, 1940 |
| 2,354,356 | Ashton | July 25, 1944 |